(12) United States Patent
Bobbitt et al.

(10) Patent No.: US 9,990,321 B2
(45) Date of Patent: Jun. 5, 2018

(54) SELECTIVELY CONNECTING A PORT OF AN ELECTRICAL DEVICE TO COMPONENTS IN THE ELECTRICAL DEVICE

(71) Applicant: Cisco Technology, Inc., San Jose, CA (US)

(72) Inventors: Lisa L. Bobbitt, Apex, NC (US); Keith Siracuse, Cary, NC (US); Sam Gupta, Costa Mesa, CA (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 499 days.

(21) Appl. No.: 14/306,366

(22) Filed: Jun. 17, 2014

(65) Prior Publication Data

US 2015/0363344 A1 Dec. 17, 2015

(51) Int. Cl.
*G06F 13/40* (2006.01)
*G06F 13/12* (2006.01)
*G06F 1/26* (2006.01)

(52) U.S. Cl.
CPC .......... *G06F 13/4022* (2013.01); *G06F 1/266* (2013.01); *G06F 13/122* (2013.01); *G06F 2213/4004* (2013.01)

(58) Field of Classification Search
CPC .................................... G06F 1/00; G06F 1/32
USPC ........................................................ 710/316
See application file for complete search history.

(56) References Cited

U.S. PATENT DOCUMENTS

| | | | |
|---|---|---|---|
| 5,928,341 A | 7/1999 | Liang | |
| 6,035,408 A * | 3/2000 | Huang | G06F 1/3203 |
| | | | 713/300 |
| 6,105,143 A * | 8/2000 | Kim | G06F 1/266 |
| | | | 713/324 |
| 7,447,922 B1 * | 11/2008 | Asbury | G06F 1/266 |
| | | | 710/303 |
| 7,523,338 B2 * | 4/2009 | Fu | G06F 1/266 |
| | | | 713/300 |
| 7,644,211 B2 | 1/2010 | Toebes et al. | |
| 7,664,136 B2 | 2/2010 | Toebes et al. | |
| 7,707,348 B2 | 4/2010 | Huotari et al. | |
| 7,751,339 B2 | 7/2010 | Melton et al. | |
| 8,069,277 B2 | 11/2011 | Suematsu | |
| 8,078,768 B2 | 12/2011 | Manor et al. | |
| 8,504,707 B2 | 8/2013 | Toebes et al. | |

(Continued)

OTHER PUBLICATIONS

International Search Report and Written Opinion in corresponding International Application No. PCT/US2015/035274, dated Nov. 3, 2015, 15 pages.

(Continued)

*Primary Examiner* — Titus Wong
(74) *Attorney, Agent, or Firm* — Edell, Shapiro & Finnan, LLC

(57) ABSTRACT

Techniques are presented herein to enable a port of an electrical device to be selectively connected to either a first component or a second component of the electrical device. The port is configured to physically interface with an external device. The first component and second component perform different functions. A signal directing circuit is coupled to the port, and is configured to selectively connect the port to one of the first and second components.

16 Claims, 9 Drawing Sheets

(56) References Cited

U.S. PATENT DOCUMENTS

| | | | |
|---|---|---|---|
| 2007/0245058 A1* | 10/2007 | Wurzburg | G06F 13/4022 710/313 |
| 2007/0260783 A1* | 11/2007 | Combs | G06F 1/266 710/62 |
| 2009/0267569 A1* | 10/2009 | Bayne | G06F 1/26 320/137 |
| 2011/0016333 A1* | 1/2011 | Scott | G06F 1/266 713/300 |
| 2011/0154082 A1* | 6/2011 | Parks | G06F 1/3203 713/323 |
| 2011/0285346 A1* | 11/2011 | Fischer | H01R 13/6675 320/107 |
| 2013/0072260 A1 | 3/2013 | Nair et al. | |
| 2014/0173141 A1* | 6/2014 | Waters | G06F 1/22 710/16 |
| 2014/0208134 A1* | 7/2014 | Waters | G06F 13/385 713/310 |

OTHER PUBLICATIONS

Partial International Search Report in counterpart International Application No. PCT/US2015/035274, dated Aug. 20, 2015, 4 pages.
"Universal Serial Bus Specification Revision 1.1", Sep. 23, 1998, XP002989938, pp. ii-85.
"Universal Serial Bus Specification Revision 1.1", Sep. 23, 1998, XP002989938, pp. 86-185.
"Universal Serial Bus Specification Revision 1.1", Sep. 23, 1998, XP002989938, pp. 186-311.

* cited by examiner

US 9,990,321 B2

SELECTIVELY CONNECTING A PORT OF AN ELECTRICAL DEVICE TO COMPONENTS IN THE ELECTRICAL DEVICE

TECHNICAL FIELD

The present disclosure relates to interfacing with a component of an electrical device.

BACKGROUND

An electrical/electronic device may include one or more ports that enable the device to exchange signals with other, external devices. In one example, the electrical device may exchange data with an external device via a cable that connects at one end to a port on the electrical device and at another end to a port on the external device. For example, the port on the electrical device may be a Universal Serial Bus (USB) port, an Ethernet port and/or a console port.

DESCRIPTION OF EXAMPLE EMBODIMENTS

Overview

Techniques are presented herein to enable a port of an electrical device to be selectively connected to either a first component or a second component of the electrical device. The port physically interfaces with an external device. The first component and second component perform different functions. A signal directing circuit is coupled to the port, and selectively connects the port to one of the first and second components.

Example Embodiments

Figure 1:
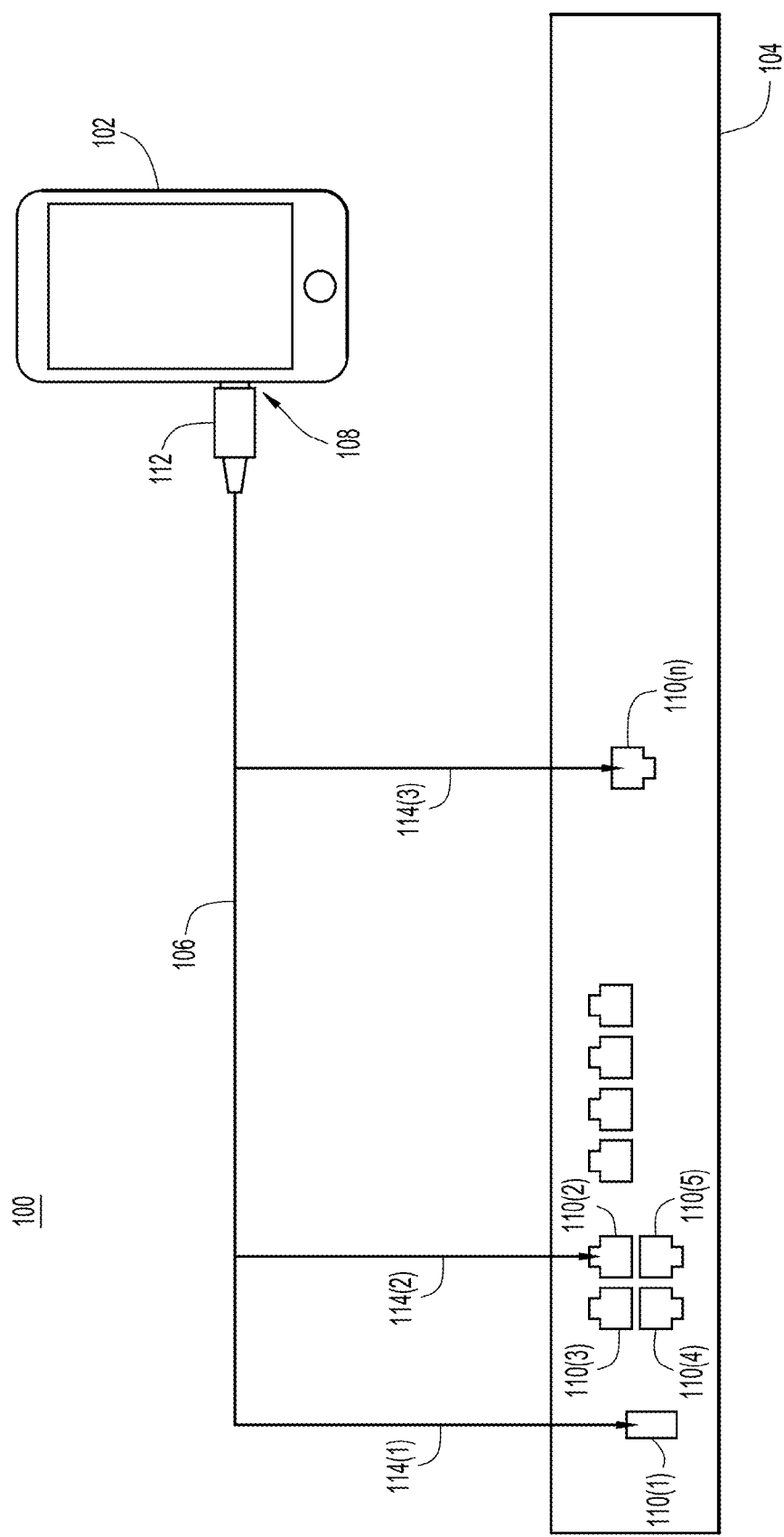
FIG. 1 shows an example system that includes an electrical device and an external device configured to physically connect to the electrical device, and in which the electrical device selectively connects a port of electrical device to one of first and second components, according to an example embodiment.

Referring first to FIG. 1, an example system 100 is shown that includes an external device 102 and an electrical/electronic device 104 (referred to hereinafter as an "electrical device"). The external device 102 can be connected to the electrical device 104 via a cable 106. In one example, the electrical device 104 is a network device, such as a router, switch or line card, and the external device 102 is a device such as a SmartPhone, tablet computer, laptop computer, desktop computer, console device, etc. These are only examples. As will become apparent hereinafter, the electrical device 104 may be any device that includes a component having the ability to interface/exchange information with the external device 102. The information may indicate or represent capabilities or configurations of the electrical device 104. There may be situations where it is not possible to power-up the electrical device 104 in order to interface with it, and in these situations, it would be useful to be able to supply power from the external device 102 to the component in the electrical device 104 in order to obtain information from or write information to the component in the electrical device 104.

The external device 102 has a port 108, and the electrical device 104 has a plurality of ports 110(1)-110(n). The port 108 of the external device 102 is configured to interface with a first connector 112 at one end of the cable 106. At another end of the cable 106, a second connector (not shown in FIG. 1) is provided that is configured to connect/interface to one of the ports 110(1)-110(n) of the electrical device 104. For example, the arrows 114(1)-114(3) show possible connections between a second connector of the cable 106 and one of the ports of the electrical device 104. The cable 106 is connected to the external device 102 at port 108 via connector 112 and is connected to the electrical device 104 at one of the ports 110(1)-110(n).

The port 108 of the external device 102 may be configured in one of a plurality of formats. For example, the port 108 may be a Universal Serial Bus (USB) port configured to receive a USB connector. In another example, the port 108 may be in another format that is configured to deliver power, such as a port that enables Inter-Integrated Circuit (I$^2$C) bus connectivity, Controller Area Network (CAN) (ISO-11898) or Power Over Ethernet (IEEE 802.3af). In general, as described by the techniques herein, the external device 102 may be configured to supply power via port 108 for delivery from the external device 102 to the electrical device 104 via the cable 106. For example, the external device 102 has a USB host processor component and the port 108 of the host device 102 is referred to hereinafter as a USB host port because it is associated with a device that has a USB host processor that is capable of supplying power to a USB client processor component. In one example, the USB host processor component may be a USB on-the-go (OTG) host processor component. The external device 102 may be referred to as a USB host device or a USB OTG host device. The connector 112 is referred to hereinafter as a USB connector 112 of the cable 106, though it should be appreciated that the techniques described herein are applicable to any port standard configured to deliver power (e.g., I²C, CAN, and IEEE 802.3af) as described in more detail hereinafter.

The ports 110(1)-110(n) of the electrical device 104 may each be configured in one of a plurality of formats. For example, port 110(1) of the electrical device 104 may be a USB port, ports 110(2)-110(5) of the electrical device 104 may be Ethernet ports (e.g., Registered Jack (RJ) 45 ports), and port 110(n) of the electrical device 104 may be a console port. It should be appreciated that these are merely examples. In general, the ports 110(1)-110(n) are configured to enable power to be received from the external device 102 over the cable 106 and to enable exchange of information between the electrical device 104 and the external device 102.

In the examples described herein, the cable 106 may be a USB-to-USB cable, wherein one end of the cable 106 (e.g., the connector 112) interfaces with the USB host port 108 of the external device 102 and another end of the cable interfaces with the USB port 110(1) of the electrical device 104. The cable 106 may also be a USB-to-Ethernet cable, interfacing with the USB host port 108 at one end of the cable 106 and one of the Ethernet ports 110(2)-110(5) of the electrical device 104 at another end of the cable 106. Likewise, the cable 106 may be a USB-to-console port cable, interfacing with the USB host port 108 of the external device 102 and the console port 110(n) of the electrical device 104. Thus, the cable 106 may be a USB-to-USB cable or may be a USB-to-non-USB cable. The cable 106 may have no active components and thus can contain only straight wires. In another form, the cable 106 may have active or passive components such as diodes to prevent power from flowing in the wrong direction when power is applied to electrical device 104.

The electrical device 104 is a device that needs power to operate. For example, the electrical device 104 may be a network router, network switch, network security appliance, a server or any type of computing device. When the electrical device 104 is powered on, it is in a "power-on mode" or "power-on state." Likewise, when the electrical device 104 is powered off, it is in a "power-off mode" or "power-off state." In the power-on state, the electrical device 104 may perform any of its normal operating functions, including exchanging information with other devices having connectivity (wired or wireless) to the electrical device 104. For example, the electrical device 104 may communicate with the external device 102 in order to authenticate the electrical device 104 before the electrical device 104 is able to join a network. Additionally, the electrical device 104, in the power-on state, may send to an external device, information about the electrical device 104 for anti-theft, encryption and inventory purposes. This information exchange may be helpful in assessing whether or not an electrical device 104 should join a secure network.

In one non-limiting example, when the electrical device 104 is in a power-off mode, it is unable to send such information, since the electrical device 104 is not receiving power, either via an internal power source or an external power source. Thus, in the power-off mode, information that may be critical to determining whether or not the electrical device 104 should join a network is not accessible from the electrical device 104. In certain situations, however, such information about the electrical device 104 may need to be obtained and verified from the electrical device 104, such as before the electrical device 104 is powered-on. For example, it may be important to attest and verify security features and other information of the electrical device 104 before the electrical device 104 is booted up. As a result, there may be a need for an external device (e.g., the external device 102) to communicate with a component in the electrical device without powering on the electrical device 104 using traditional start up or boot-up techniques.

The techniques described herein enable communication between the external device 102 and a component in the electrical device 104, such as when the electrical device 104 is in a power-off mode. In one example, the external device 102 is able to deliver power to a component of the electrical device 104 via the cable 106, and such power delivery may be accomplished even when the port of the external device 104 that interfaces with the cable 106 is not a USB port or another port that is designed to be able to receive power. In other words, communication with a component in the electrical device 104 (when the electrical device is in the power-off mode) can be achieved via a USB-to-USB cable and also via a USB-to-non-USB cable (e.g., a USB-to-Ethernet cable or a USB-to-console port cable). Accordingly, non-USB ports (and other traditional non-powered ports) on the electrical device 104 are used to supply power from external device 102 via the cable 106 as if the cable was connected to a USB port or other powered port on the electrical device 104. Upon receiving the power, a component in electrical device 104 may provide credential or other information to the external device 102 or to another external device.

Figure 2:
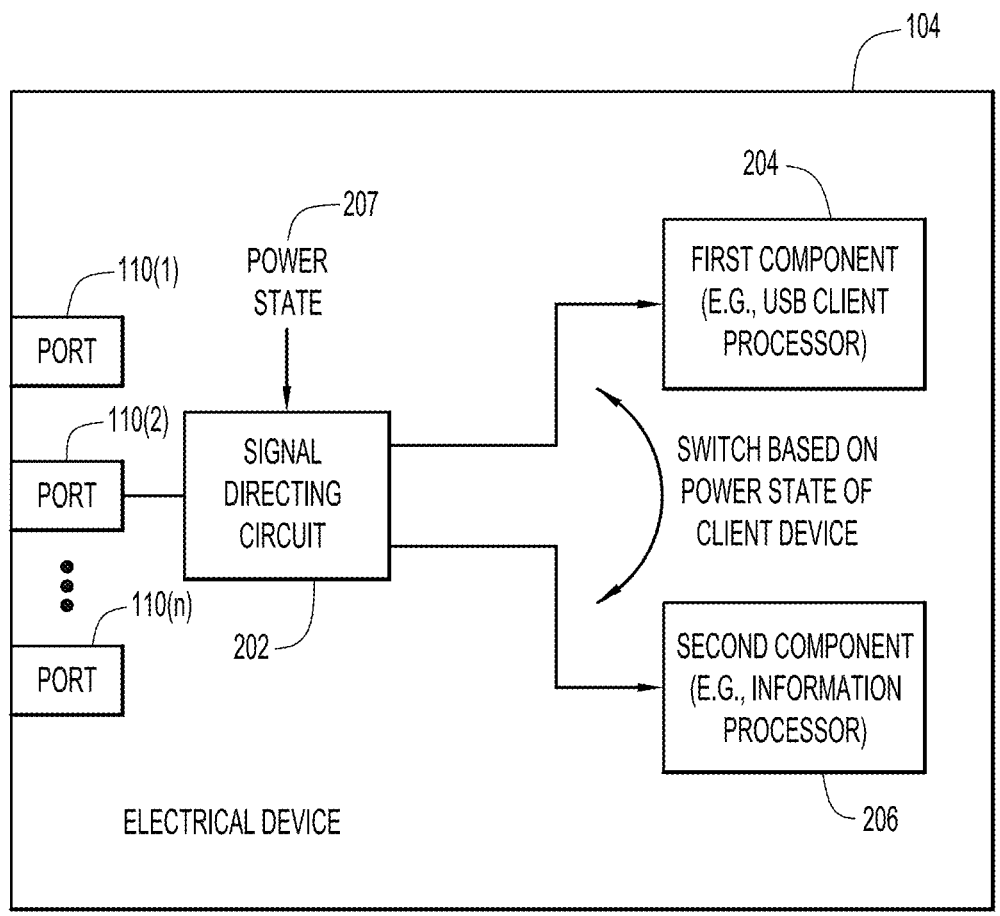
FIG. 2 is a block diagram of the electrical device having a signal directing circuit to selectively connect a port of the electrical device to one of the first and second components, according to an example embodiment.

Reference is now made to FIG. 2. FIG. 2 depicts a high level example block diagram of the electrical device 104. The electrical device 104 has the aforementioned plurality of ports 110(1)-110(n). At least one of the ports, e.g., port 110(2), is coupled to a signal directing circuit 202. The signal directing circuit 202 is configured to connect the port 110(2) to either a first component 204 or to processor second component 206. The first component 204 and second component 206 perform different functions. That is, the first component 204 performs a first function and the second component 206 performs a second function. For example, the first component 204 may be a USB client processor ("client processor") for example, and the second component 206 may be an information processor, such as a physical layer (PHY) processor used for handling Ethernet communications.

As described above in connection with FIG. 1, the ports 110(1)-110(n) may be of different formats. For example, the ports 110(1)-110(n) may be USB ports, Ethernet ports and/or console ports. The signal directing circuit 202 may connect to any of the ports 110(1)-110(n), even though it is shown connected to port 110(2). The signal directing circuit 202 is configured to selectively connect the port 110(2) to one of the first component 204 and the second component 206, that is, to either the first component 204 or the second component 206. In one form, and as shown at 207 in FIG. 2, information about the power state (power-on or power-off) of the electrical device 104 is supplied to the signal directing circuit 202. In one form, the signal directing circuit 202 connects the port 110(2) to either the first component 204 or the second component 206, depending on the power state of the electrical device 104. Furthermore, the port to which the signal directing circuit is connected includes a plurality of terminals dedicated/configured for signal routing to enable communication with the second component 206 and not dedicated/configured to enable communication with the first component 204. As a result, select ones of the terminals of the port, according to the techniques presented herein, are used in ways not intended (for communication with the second component 206) in order to achieve the necessary signal routing to enable communication with the first component.

As further variation, the external device 102 may also be a switch, router, line card, etc. In this scenario, a device would be connected to the switch (which may have many instances of electrical devices 104 connected to it in a powered down state) to access the second component 206 in one of the instances of the electrical device 104. This could be done to perform attestation of many electrical devices 104 at the same time.

As described hereinafter in connection with FIGS. 3-8, the signal directing circuit 202 may, include for example, a physical switch, a relay, an analog switch, an optical switch, one or more diodes, etc., and one or more electrical connections, in order to selectively connect one of the ports, e.g., port 110(2) to either the first component 204 or the second component 206 based on the power state of the electrical device 104, or completely independent of the power state of the electrical device 104.

The functions of the first component 204, e.g., USB client processor, may be implemented by one or more Application Specific Integrated Circuits (ASICs), digital signal processors (DSPs), microprocessor, microcontroller, or by any other circuits or circuitry. In one example, the first component 204 may be a Hardware Security Module (HSM), anti-counterfeiting chip, etc.

The second component 206 may be a standards-compliant network processor that is configured to receive and send signals to/from one of the ports 110(1)-110(n). The functions of the second component 206 may be implemented by one or more ASICs, DSPs, microprocessor, microcontroller, or by any other circuits or circuitry.

Figure 3:
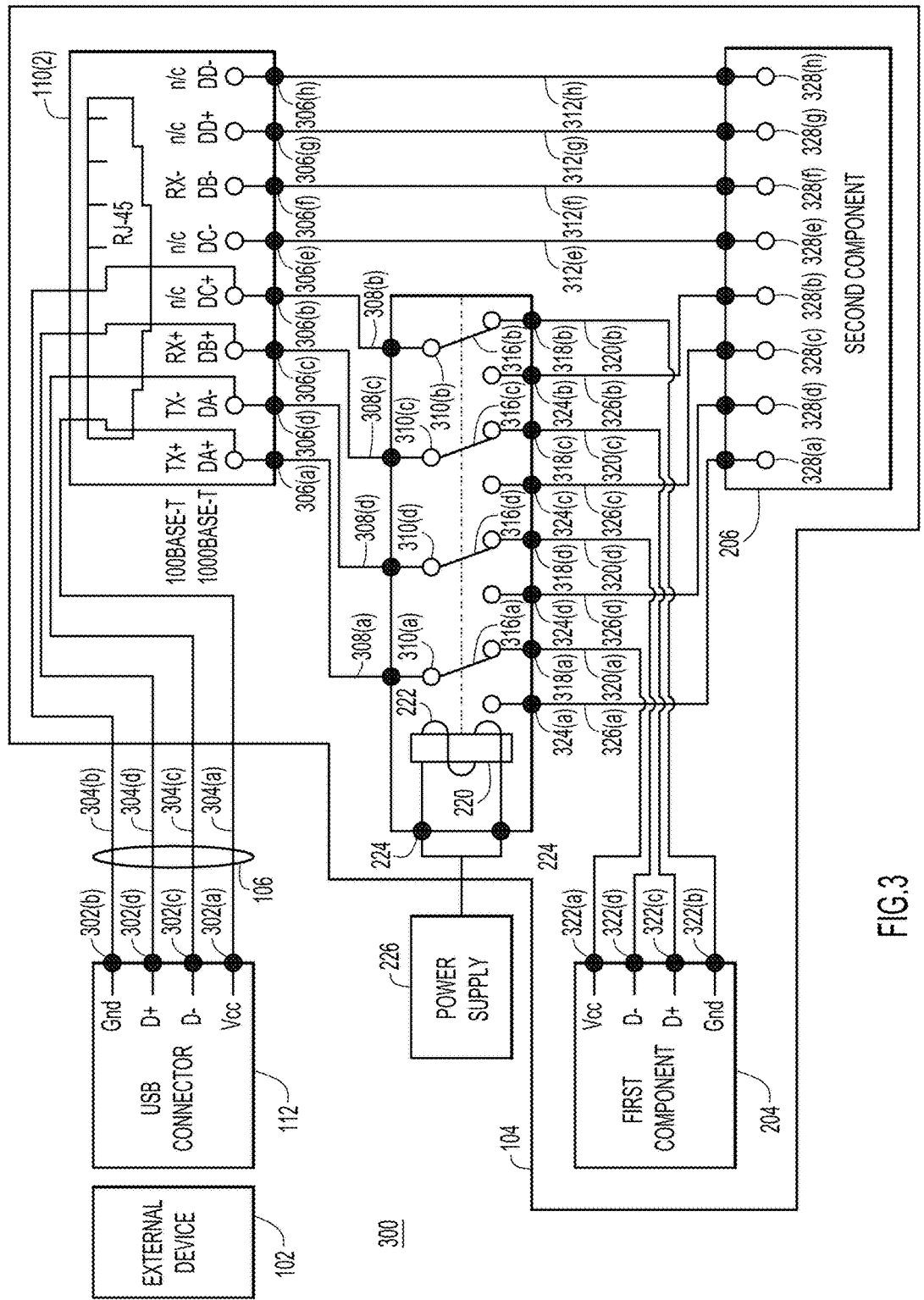
FIG. 3 is a schematic diagram in which the signal directing circuit is a relay, according to an example embodiment.

Reference is now made to FIG. 3 that shows a first form of the signal directing circuit in a system 300 that includes the external device 102, electrical device 104 and cable 106. In FIG. 3, the connector 112 of the cable 106 is shown as a USB connector. The USB connector 112 is configured to interface with a USB port of the external device 102. As stated above in connection with FIG. 1, it should be appreciated that the depiction of the connector 112 as a USB connector is merely an example, and other formats may be used. As one example, FIG. 3 is described in the context of a USB connector that interfaces with the port 108 of the external device 102.

The USB connector 112 has four terminals (pins) connected to wires in the cable 106. It should be appreciated that the four terminals are merely an example. The four terminals of the USB connector 112 are shown at reference numerals 302(a)-302(d). Terminal 302(a) is for a voltage supply connection (shown as "Vcc"). The voltage supply connection 302(a) is connected to wire 304(a) of the cable 106 to deliver a voltage supply to the electrical device 104. Terminal 302(b) is designated as ground pin (shown as "Gnd") and is connected to wire 304(b) of the cable 106. Terminals 302(c) and 302(d) may be differential data transmission pins (shown as "D+" and "D−" respectively) and are connected to wires 304(c) and 304(d) of the cable 106.

The cable 106 is configured to interface with the port 110(2) of the electrical device 104. In the example of FIG. 3, the port 110(2) is an Ethernet port (e.g., an RJ 45 port), and thus, the cable 106 in FIG. 3 is a USB-to-Ethernet conversion cable. The cable 106 interfaces with the Ethernet port 110(2) via an Ethernet connector (not shown in FIG. 3). It should be appreciated that the port 110(2) may be any other port type, including a USB port, a console port or a port of any other standard. The port 110(2) has connections to the wires 304(a)-304(d) of the cable 106. The wires 304(a)-304(d) connect to terminals/pins on the port 110(2). For example, wire 304(a) connects to terminal 306(a), wire 304(b) connects to terminal 306(b) and wires 304(c) and 304(d) connect to terminals 306(c) and 306(d). The port 110(2) also has terminals 306(e)-306(h). The terminals 306(e)-306(h) may interface with wires of an Ethernet cable that would normally connect to port 110(2), and as shown in FIG. 3, the terminals 306(e)-306(h) of the port 110(2) are connected to the second component 206.

When the cable 106 is connected to the external device 102 via the USB connector 112 at port 108 and is connected to the electrical device 104 via an Ethernet connector at the port 110(2), the external device 102 and the electrical device 104 are in communication with each other across the cable 106. The external device 102 can exchange signals with (and deliver power to) a component of the electrical device 104 (e.g., a USB client processor) via the cable 106. In this way, external device 102 can communicate with the first component 204 of the electrical device 104 via the cable 106, such as when the electrical device 104 is powered-off.

The electrical device 104 has wires (electrical connections) 308(a)-308(d) that connect the port 110(2) to the signal directing circuit 202. As shown in FIG. 3, the wires 308(a)-308(d) connect to terminals 306(a)-306(d) of the port 110(2) and also connect to terminals 310(a)-310(d) of the signal directing circuit 202. Additionally, the electrical device 104 has wires 312(e)-312(h). Wires 312(e)-312(h) connect terminals 306(e)-306(h) of the port 110(2) to terminals 314(e)-312(h) of the second component 206. Thus, in the example in FIG. 3, a first subset of wires (wires 308(a)-308(d)) of the electrical device 104 connect the port 110(2) to the signal directing circuit 202, and a second subset of wires (wires 312(e)-312(h)) of the electrical device 104 connect the port 110(2) to the second component 206.

In the example of FIG. 3, the signal directing circuit 202 includes a relay, and the relay includes an electromagnetic or similar element 220, a wire 222 around the electromagnetic element 220 and terminals 224 coupled to opposite ends of the wire 222. The terminals 224 are connected to a voltage or current derived from a power supply 226 of the electrical device 104. When the electrical device 104 is turned on (i.e., power-on by connecting to an external power source, e.g., wall outlet or backup power source) the power supply 226 is turned on and a voltage or current, output by the power supply 226 is coupled to the terminals 224 of the relay. The signal directing circuit 202 has a plurality of switches, shown at 316(a)-316(d), connected to the wires 308(a)-308(d).

When the electrical device 104 is in a power-off mode (no voltage or current is supplied to the terminals 224 of the relay), the signal directing circuit 202 operates in a "pull down" configuration. When in the pull down configuration, the switches 316(a)-316(d) are in a first position and therefore connect the terminals 310(a)-310(d) to terminals 318(a)-318(d) of the relay. The terminals 318(a)-318(d) of the relay connect with wires 320(a)-320(d), which in turn provide a connection between the relay and the first component 204, e.g., USB client processor. For example, the wires 320(a)-320(d) connect to terminals 322(a)-322(d) of the first component 204. The terminals 322(a) to 322(d) of the first component 204 are similar to the terminals 302(a)-302(d) described in connection with the USB connector 112. For example, terminal 322(a) is for a voltage supply connection, terminal 322(b) is for a ground pin and terminals 322(c) and 322(d) are differential data pins.

Thus, when the electrical device 104 is in a power-off mode, the relay is in the pull down configuration such that the switches 316(a)-316(d) provide a connection between the port 110(2) and the first component 204. As a result, when the electrical device 104 is in a power-off mode, there is a communication path between the first component 204 and the external device 102, and the external device 102 can supply power to the first component 204, as well.

When the electrical device 104 is in a power-on mode, power is applied at the terminals 224, and the relay switches from the "pull down" configuration to a "release" configuration. In the release configuration, the switches 316(a)-316(d) of the relay are in a second position to connect the terminals 310(a)-310(d) to terminals 324(a)-324(d) of the relay. The terminals 324(a)-324(d) of the relay connect with wires 326(a)-326(d), which in turn provide a connection between the relay and the second component 206 at terminals 328(a)-328(d). Thus, when the electrical device 104 is in a power-on mode, the relay is in the release configuration such that the switches 316(a)-316(d) enable a connection between the port 110(2) and the second component 206. As previously mentioned, in one example, a subset of the terminals of the port 110(2) may always be connected to the second component 206.

Thus, in FIG. 3, a non-USB port (port 110(2)) of the electrical device 104 can function as a USB port (e.g., a USB client port), and accordingly, the first component 204, e.g., USB client processor) of the electrical device 104 can communicate with the external device 102 even when the electrical device 104 is in a power-off mode. The external device 102 can also operate as the power source for the first component 204 of the electrical device 104 when the electrical device 104 is in a power-off mode. This enables the first component 204 of the electrical device 104 to send information, such as attestation information to hardware security modules, to the external device 102 or to another external device. When the electrical device 104 is in the power-on mode, the port 110(2) reverts to its primary/normal interface operation (e.g., to operate as an Ethernet port with all connections in communication with the second component 206), and the path between the port 110(2) and the first component 204 is inactive.

Figure 4:
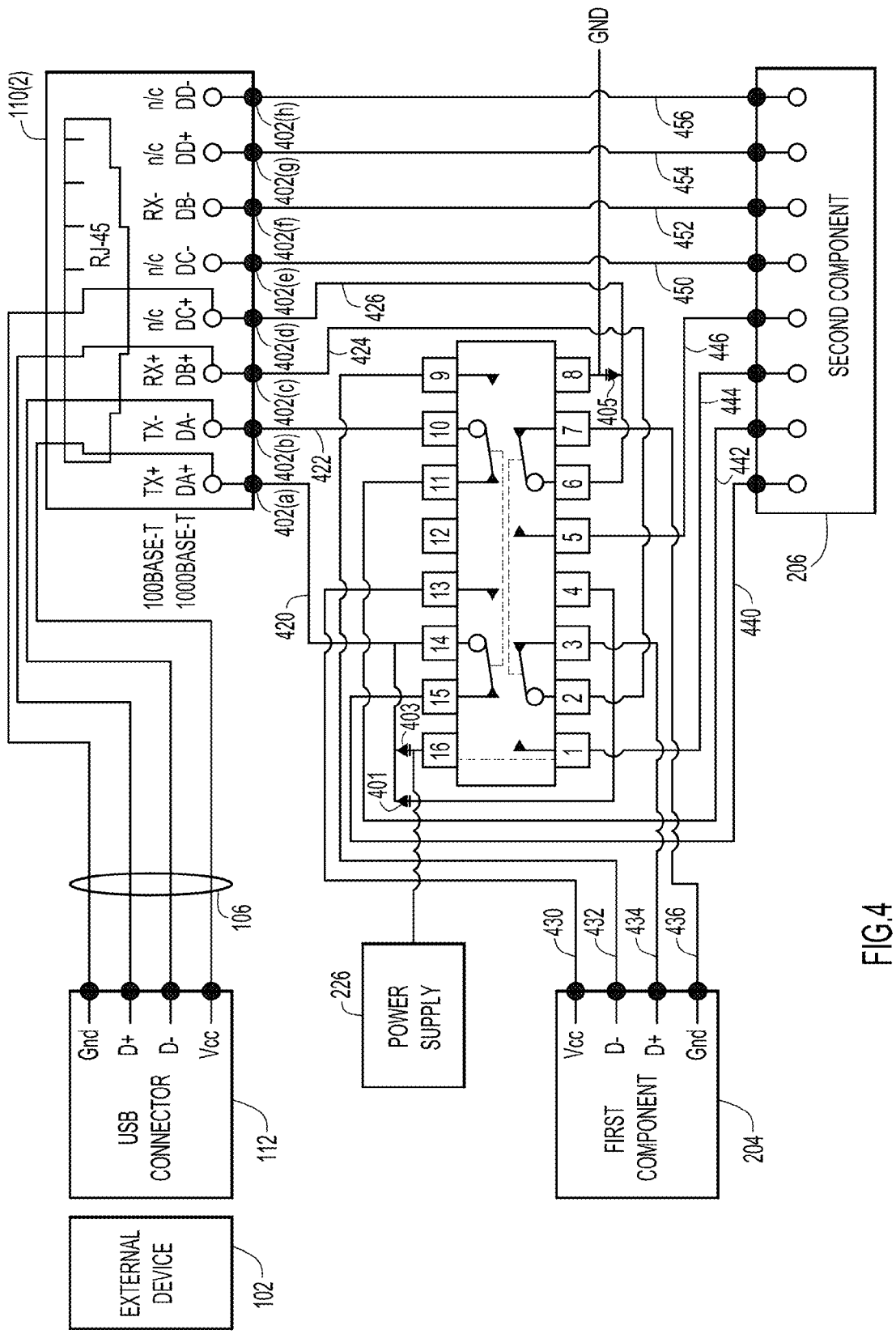
FIG. 4 is a schematic diagram in which the signal directing circuit is an analog switch, according to an example embodiment.

As stated above, the signal directing circuit 202 can be embodied by any circuitry that is configured to selectively connect the port 110(2) to either the first component 204 or the second component 206. Reference is now made to FIG. 4 for another example of a signal directing circuit. In this example, the signal directing circuit is an analog switch 400. An example of a suitable analog switch is a MAX4702, manufactured by Maxim Integrated. One form of the analog switch 400 includes 16 pins, numbered 1-16 as shown in FIG. 4. The power supply 226 is coupled to pin 16. A diode 401 is coupled between pins 4 and pins 14 and 16. Similarly, a diode 403 is connected to pin 16. A diode 405 is also connected to pin 8, which is grounded.

The pins of the analog switch 400 used for purposes of the configuration shown in FIG. 4 are pins 1-11 and 13-16. The functions of these pins are as follows:

| 1 | NO1-Analog Switch 1 | Normal Open Terminal |
|---|---|---|
| 2 | COM1-Analog Switch 1 | Common Terminal |
| 3 | NC1-Analog Switch 1 | Normally Closed Terminal |
| 4 | IN-Digital Control Input for Switches 1, 2, 3 and 4 | |
| 5 | NO2-Analog Switch 2 | Normal Open Terminal |
| 6 | COM2-Analog Switch 2 | Common Terminal |
| 7 | NC2-Analog Switch 2 | Normal Closed Terminal |
| 8 | GND | Ground |
| 9 | NO3-Analog Switch 3 | Normally Open Terminal |
| 10 | COM3-Analog Switch 3 | Common Terminal |
| 11 | NC3-Analog Switch 3 | Normally Closed Terminal |
| 12 | $V_L$ | Logic Power Supply Input |
| 13 | NO4-Analog Switch 4 | Normally Open Terminal |
| 14 | COM4-Analog Switch 4 | Common Terminal |
| 15 | NC4-Analog Switch 4 | Normally Closed Terminal |
| 16 | V+ | Positive Voltage Input |

Terminals 402(a)-402(d) of the port 110(2) are connected by wires/conductive traces (electrical connections) 420, 422, 424 and 426 to pins 14, 10, 2 and 6, respectively, of the analog switch 400. The Vcc, D−, D+ and GND terminals of the first component 204 are connected by electrical connections 430, 432, 434, 436 to pins 13, 9, 3 and 7, respectively, of the analog switch 400. Pins 1, 5, 11 and 15 of the analog switch 400 are connected by electrical connections 440, 442, 44 and 446 to the information processor 206. Terminals 402(e)-402(h) of the port 110(2) are connected directly by electrical connections 450, 452, 454 and 456 to the second component 206. The connections shown in FIG. 4 are by example only and one with ordinary skill in the art would know how to adapt these connections to different types of analog switches.

In operation, since the power supply 236 is connected to pin 4, it serves as a control input to the analog switch 400. When the power of the electrical device 104 is on, the analog switch 400 connects terminals 402(a)-402(d) of the port 110(2) to the second component 206 by way of pins 1, 5, 11 and 15 of the analog switch 400. When power of the electrical device 104 is off, the analog switch 400 connects terminals 402(e)-402(h) of the port 110(2) to appropriate ones of the Vcc, D−, D+ and GND terminals of the first component 204.

Figure 5:
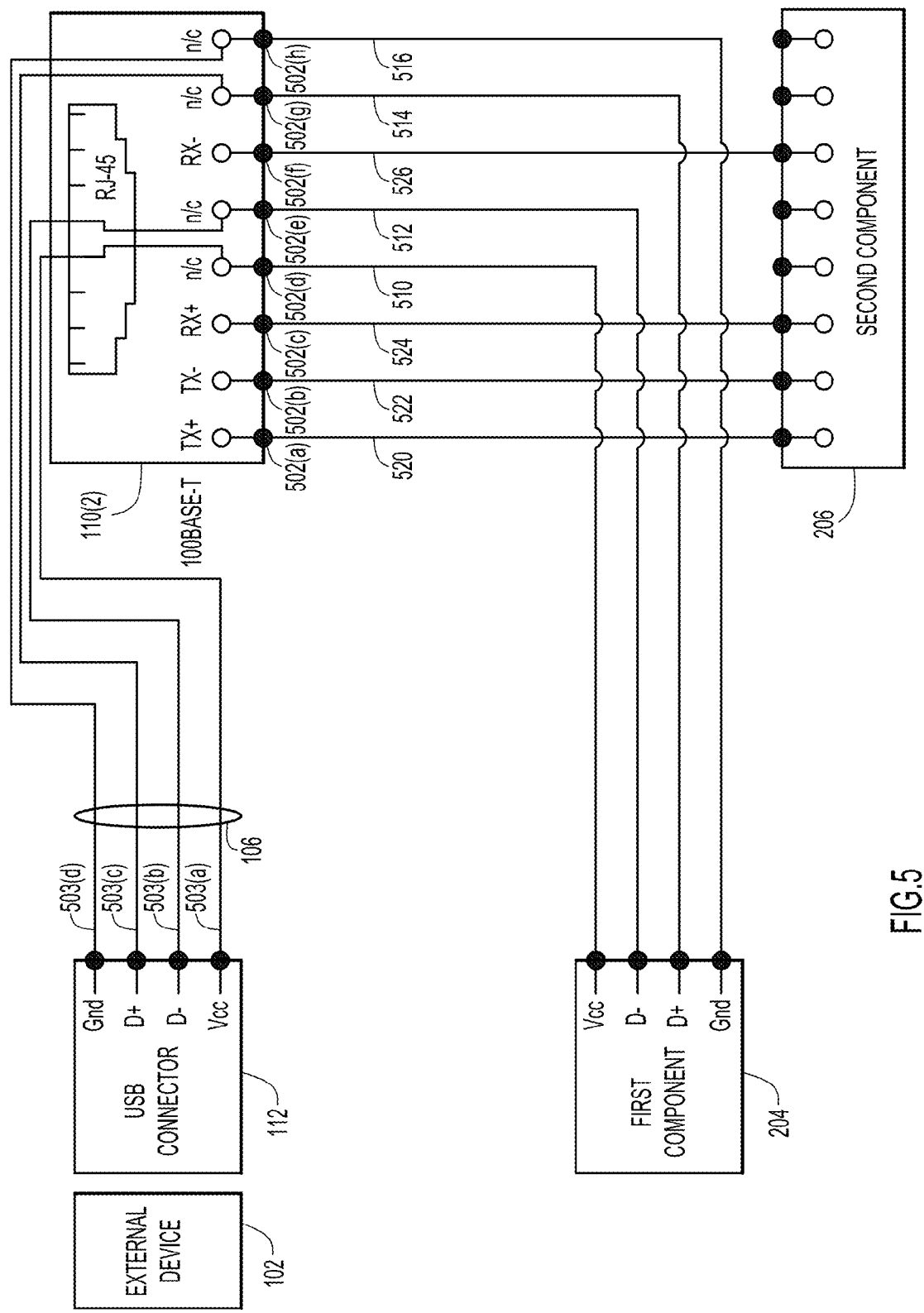
FIG. 5 is a schematic diagram in which the signal directing circuit includes one or more unused terminals of the port, according to an example embodiment.

Reference is now made to FIG. 5 for an example in which IEEE 802.3 unused pins of the port 110(2) are used to connect the external device 102 to the first component 204 when the external device 102 is connected to the USB connector 112. Specifically, when the port 110(2) is an RJ-45 jack, pins 502(d), 502(e), 502(g) and 502(h) are not used for 100Base-T Ethernet operation. The cable 106 contains wires 503(a)-503(d) that connect the Vcc, D−, D+ and GND terminals of the USB connector to the unused pins/terminals of the port 110(2). Electrical connections 510, 512, 514 and 516 connect pins 502(d), 502(e), 502(g) and 502(h) to the Vcc, D−, D+ and GND terminals, respectively, of the first component 204. This achieves a connection of the Vcc, D−, D+ and GND terminals of USB connector 112 to corresponding terminals of component 204. The second component 206 is an Ethernet PHY in this example, and wires or conductive traces 520, 522, 524 and 526 connect between the used pins 502(a), 502(b), 502(c) and 502(f) and the second component 206. When the port 110(2) is operating as an Ethernet port, a cable is used that has a USB connector on one end (to interface with the port 108 of the host device 102) and an Ethernet connector (e.g., an RJ 45) connector on the other end to interface with port 110(2).

Thus, in the example of FIG. 5, the signal directing circuit consists of the unused pins of the port 110(2) together with the electrical connections 510, 512, 514 and 516 that connect to the Vcc, D−, D+ and GND terminals, respectively, of the component 204. Moreover, the example configuration of FIG. 5 does not require any circuitry that is responsive to the power state of the electrical device 104. By virtue of the static electrical connections between the unused pins of the port 110(2) and the first component 204, the external device 102 is connected to the first component 204 when the external device 102 is connected to the USB connector 112. Conversely, when an Ethernet cable is connected to port 110(2), appropriate connections are made to the second component 206.

Figure 6:
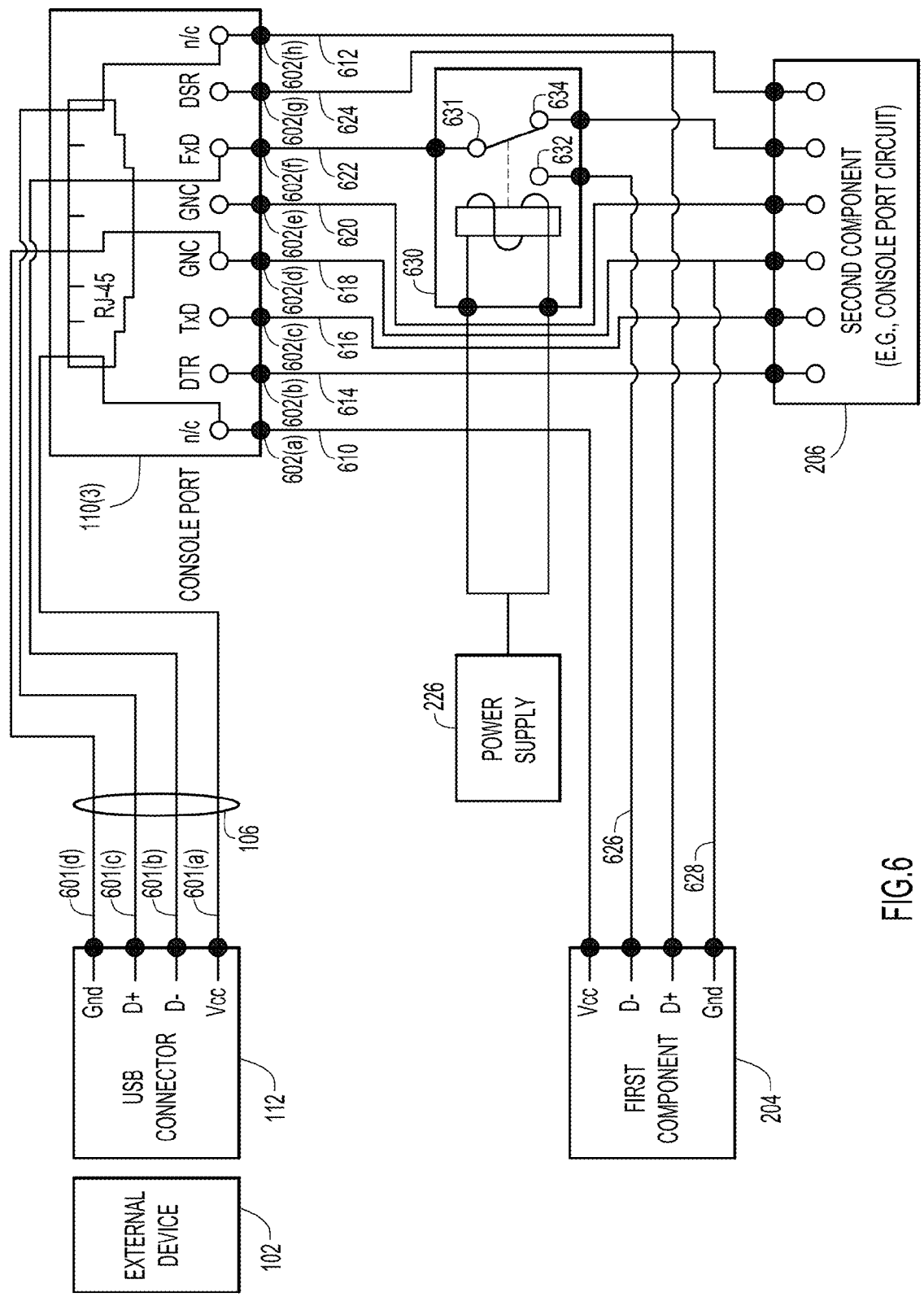
FIG. 6 is a schematic diagram in which the signal directing circuit includes a relay configured to selectively connect a signal terminal to either the first component or the second component, according to an example embodiment.

FIG. 6 illustrates a configuration in which an arbitrary one of ports 110(1)-110(n), e.g., port 110(3) for example, is a cable console port (using an RJ-45 connector format). The port 110(3) has eight terminals/pins 602(a)-602(h). Pins 602(a) and 602(h) are unused. Pin 602(b) is for Data Terminal Ready (DTR), pin 602(c) is for TxD, pins 602(d) and 602(e) are for GND, pin 602(f) is for RxD, and pin 602(g) is for Data Sender/Source Ready (DSR). Cable 106 includes wires 601(a)-601(d) that connect the VCC, D-, D+ and GND terminals, respectively, of the USB connector 112 to pins 602(a), 602(d), 602(f) and 602(h). Electrical connections 610 and 612 connect unused pins 602(a) and 602(h) to the Vcc and D+ terminals on the first component 204. Electrical connections 614, 616, 618, 620, 622 and 624 connect to pins 610(b)-610(g) (for DTR, TxD, GND, GND, RxD and DSR) at one end, and electrical connections 614, 616, 618 and 624 connect to the second component 206, which in this example is a console port circuit. When the port 110(3) is operating as a console port, a cable is used that has a USB connector on one end to interface with port 108 and a console connector to interface with port 110(3).

A relay unit 630 is provided that, similar to the one shown in FIG. 4, is coupled to power supply 226. Electrical connection 622 connects the RxD pin to an input terminal 631 of the relay unit 630. The relay unit 630 switches between terminals 632 and 634 to connect the RxD pin to either the D– terminal on the first component 204 or to a terminal of the second component 206. Electrical connection 626 connects between the D– terminal of the first component 204 and terminal 632 of the relay unit, and electrical connection 628 connects between the GND terminal of the component 204 and the wire or conductive trace 618.

In operation, with power on, the relay unit 630 connects to terminal 634 so that the RxD pin 602(f) of the port 110(3) is connected to the second component 206 for normal console operations. When power is off, the relay unit 630 connects to terminal 632 so that pin 602(f) is connected to the D– terminal of the first component 204. Since the Vcc, D+ and GND terminals of the first component 204 are directly connected to the appropriate terminals of the USB connector 112 (by way of the port 110(3)), the external device 102 can communicate with the first component 204. Thus, FIG. 6 illustrates an example in which some terminals are directly connected between the port 110(3) and the first component 204, and one or more other terminals are selectively connected to the first component 204 based on power state of the electrical device 104.

Figure 7:
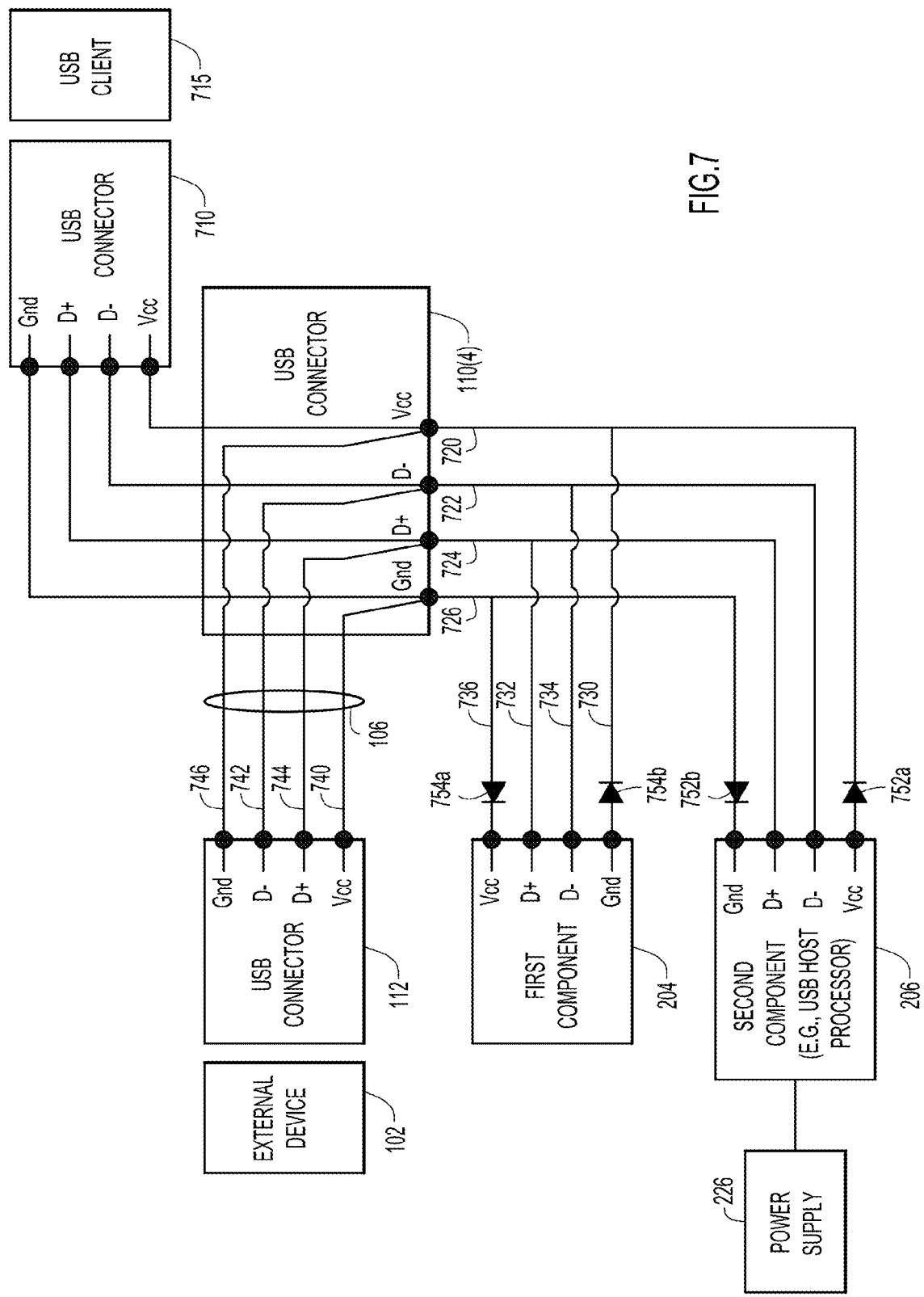
FIG. 7 is a schematic diagram in which the signal directing circuit includes at least a first diode connected in a signal path between the port and the first component and at least a second diode connected in a signal path between the port and the second component, according to an example embodiment.

Turning now to FIG. 7, still another example configuration is shown. In this example, the external device 102 connects, by way of USB connector 112 and cable 106, to a port 110(4) that is a USB port on the electrical device 104, in one example. In this example, the first component 204 may be a USB client processor and the second component 206 may be a USB host processor module that can, for example, communicate with an external USB client 714 by way of USB connector 710. Thus, normally, the port 110(4) enables communication between a USB client, e.g., USB client 715, and the second component 206 (e.g., a USB host processor). However, the port 110(4) can also be used to enable communication between the first component 204 and the external device 102. The power supply 226 is connected to the second component 206.

Electrical connections 720, 722, 724 and 726 connect between similar terminals of port 110(4) and the second component 206. Electrical connections 730, 732, 734 and 736 connect between terminals of the first component 204 and the port 110(4) in an opposite manner. That is, electrical connection 730 connects between the GND terminal of the first component 204 and the Vcc terminal of the port 110(4) and electrical connection 736 connects between the Vcc terminal of the first component 204 and the GND terminal of port 110(4). This is opposite to the normal connections. Electrical connection 732 connects between the D+ terminal of the first component 204 and the D+ terminal of the port 110(4), and similarly electrical connection 734 connects between the D– terminal of the first component 204 and the D– terminal of the port 110(4). Moreover, in cable 106, the wires 740, 742, 744 and 746 are arranged such that when the cable is plugged into the port 110(4), wire 740 connects the Vcc terminal on the USB connector 112 to the GND terminal of the port 110(4), wires 742 and 744 connect between the D– and D+ terminals, respectively, of the USB connector 112 and the D– and D+ terminals, respectively, of the port 110(4), and electrical connection 746 connects the GND terminal of the USB connector 112 to the Vcc terminal of the port 110(4). An adapter cable (A-A male USB adapter) may be provided such that the electrical device 104 is able to receive power from the external device 102.

In the example configuration of FIG. 7, the signal directing circuit includes the electrical connections 720-726 and 730-736, along with diodes 752a and 752b connected at the Vcc and GND terminals of the second component 206, and diodes 754a and 754b connected at the Vcc and GND terminals of the first component 204. More specifically, diode 752a is connected such that it forms a closed circuit (low resistance path) when the electrical device 104 is powered-up and thus Vcc is present on electrical connection 720 from the second component 206, and similarly diode 752b is connected so that that it forms a closed circuit (low resistance path) when GND is present on electrical connection 726, which occurs when the electrical device 104 is in a powered-on mode (and a USB client, e.g., USB client 715 may be connected in the normal manner to port 110(4)). On the other hand, when the electrical device is in a powered-on mode, due to the electrical connections 730 and 736 in the cable 106 to port 110(4) and the direction of diodes 754a and 754b, diode 754a open circuits (due to GND on connection 736) and diode 754b open circuits (due to connection to Vcc on connection 730).

The opposite occurs when the electrical device 104 is in a powered-off mode. The USB connector 112 is connected to port 110(4) due to the electrical connections 740 and 746. When an external device 102 (and its USB connector 112) is connected to port 110(4), Vcc (from the external device 102) is present on connection 726 and GND is present on connection 720 which causes diodes 752a and 752b to open circuit. Conversely, Vcc on connection 726 is coupled to the diode 754a, which forms a closed circuit to the Vcc terminal on first component 204. Similarly, GND on connection 720 is coupled to diode 754b, which forms a closed circuit to the GND terminal of the first component 204.

Thus, FIG. 7 shows the use of complementary and oppositely connected diodes in the Vcc and GND paths of the first component 204 and the second component 206, and oppositely arranged connections for Vcc and GND for the USB connector 112 and the USB connector 710. This arrangement achieves the desired functions of connecting an external USB client 715 to the second component 206 (e.g., USB host processor) when the electrical device 104 is powered-on (and power is from the power supply 226 is coupled to the second component 206) and connecting the external device 102 to the first component 204 when the electrical device 104 is powered-off and the external device 102 is connected to port 110(4).

Figure 8:
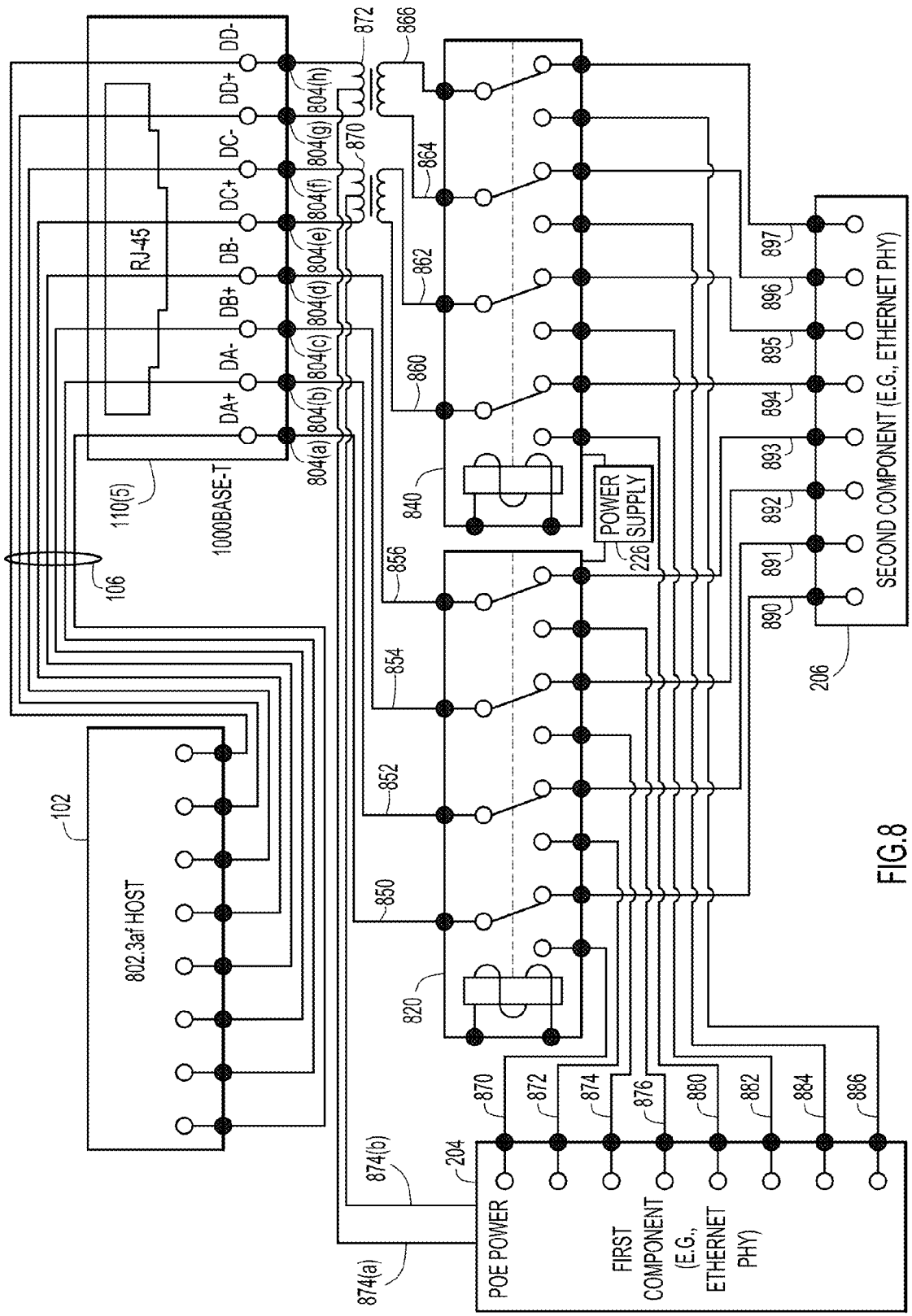
FIG. 8 is a schematic diagram in which the external device is a Power over Ethernet (PoE) source, the first component is a PoE powered device and the signal directing circuit includes multiple relays, according to an example embodiment.

Reference is now made to FIG. 8. FIG. 8 shows an example configuration for Power over Ethernet (PoE) applications, and using the IEEE 802.3af, 1000 (1 Gigabit) DC and Bi-Data (mode B). In this example, the external device 102 is an IEEE 802.3af host, the first component 204 is an Ethernet PHY processor (with PoE powered device capability) and the second component 206 is an Ethernet PHY processor. The first component 204 also has PoE power terminals 802(*a*) and 802(*b*) so that it can operate as a PoE powered device.

The port 110(5), in this example, is an RJ-45 port and includes terminals to support 1000Base-T communication (DA+, DA−, DB+, DB−, DC+, DC−, DD+, DD−) at terminals 804(*a*)-804(*h*). Electrical connections 850, 852, 854 and 856 connect terminals 804(*a*)-804(*d*) of port 110(5) to input terminals of relay 820. Electrical connections 860, 862, 864, and 866 connect the terminals 804(*e*)-804(*h*) of the port 110(5) to input terminals of relay unit 840. Transformer 870 is coupled between wires 860 and 862, and the input terminals of the relay unit 840. Likewise, transformer 872 is coupled between wires 864 and 866, and the input terminals of the relay unit 840. Wires 874(*a*) and 874(*b*) connect between the PoE terminals 802(*a*) and 802(*b*) and the transformers 870 and 872, respectively.

The relay unit 820 includes four input terminals connected to wires 850, 852, 854 and 856, and two output terminals associated with each input terminal, for a total of eight output terminals. The relay unit 820 includes four switches, each of which connects its associated input terminal to one of the associated output terminal pairs. One output terminal for each switch is connected to a terminal on the first component 204 (Ethernet PHY) and the other output terminal for each switch is connected to the second component 206 (Ethernet PHY). A similar arrangement is provided for relay unit 840, with respect to the electrical connections 860, 862, 864 and 866. Electrical connections 870, 872, 874 and 876 connect first output terminals of output terminal pairs of the relay unit 820 to the first component 204 and electrical connections 880, 882, 884 and 886 connect first output terminals of output terminal pairs of the relay unit 830 to the first component 204. Similarly, electrical connections 890, 891, 892, 893 electrically connect second output terminals of the output terminal pairs of relay unit 820 to the second component 206 and electrical connections 894, 895, 896 and 897 connect second output terminals of the output terminal pairs of relay unit 840 to the second component 206.

The relay units 820 and 840 operate in a manner similar to that described above in connection with FIGS. 3 and 6. Each relay unit includes an electromagnetic element that is coupled to the power supply of the electrical device 104. When the electrical device 104 is powered-up, the switches of the relay units 820 and 840 are in a first position in which they are connected to the associated output terminal that connects to the second component 206, and when the electrical device 104 is power-off mode, the switches of the relay units 820 and 840 are in a second position in which they are connected to the associated output terminal that connects to the first component 204. Thus, when the switches of the relay units 820 and 840 are in the second position, the port 110(5) is connected to the first component 204, thereby connecting the external device 102 (e.g., the 802.3af host) to the component 204 and enabling communication there between. Moreover, the first component 204 can receive PoE power via wires 874*a* and 874*b* from the external device, e.g., an IEEE 802.3af host. While FIG. 8 shows use of IEEE 802.3af powering from the external device, it should be understood that the second component 206 can also provide 802.3af power to a device plugged into port 110(5) when the electrical device is in a powered-up state.

It is to be understood that the different examples of the signal directing circuit shown in FIGS. 3-8 can be used in any of the embodiments presented herein. That is, an analog switch and a relay can be used interchangeably, and diodes can be used instead of an analog switch or relay.

The configurations presented herein enable re-using existing ports on the electrical device 104 with alternative paths when the electrical device 104 without requiring additional interfaces (e.g., additional ports). Thus, out-of-band inquiries for information may be made to the electrical device 104 for a variety of applications, e.g., to attest and validate the electrical device 104. There are other types of interface standards for which these techniques may be useful, such as the High Definition Media Interface (HDMI) standard.

Figure 9:
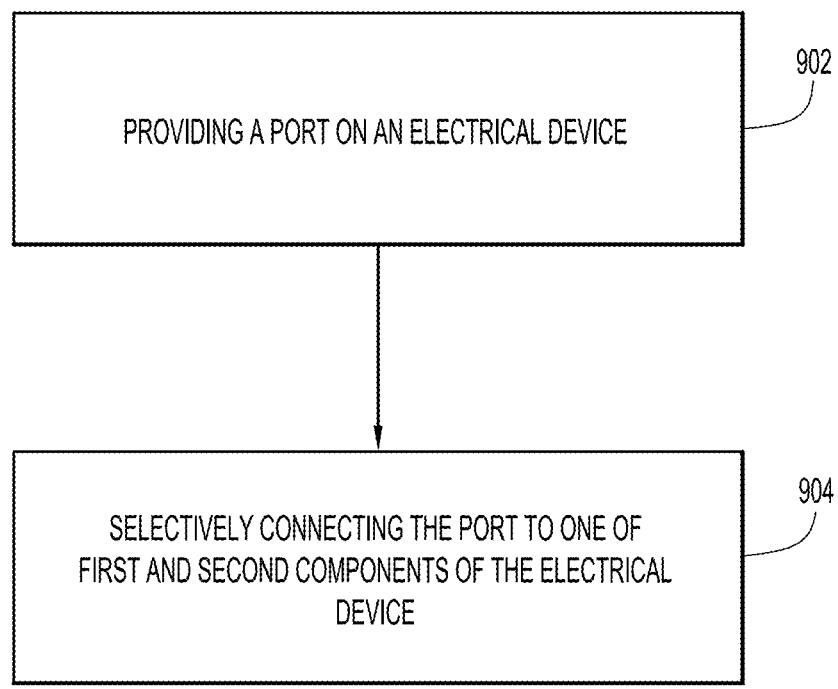
FIG. 9 shows an example flow chart depicting a method of the selectively connecting a port to one of first and second components in an electrical device, according to an example embodiment.

Reference is now made to FIG. 9. FIG. 9 shows an example high level flow chart 900 for a method to achieve the selective connectivity between a port of the electrical device and one of first and second components of the electrical device. At 902, a port is provided on an electrical device, the port being configured to physically interface with an external device. At 904, the port is selectively connected to one of first and second components of the electrical device. As explained above, the selective connecting operation 904 may be based on a power state of the electrical device such that at least one terminal of the port is connected to the first component when the electrical device is in a power-off mode and the port is connected to the second component when the electrical device is in a power-on mode.

To summarize, an apparatus (i.e., an electrical device) is provided that includes a port, first and second components, wherein the first and second components perform different functions, and a signal directing circuit coupled to the port. That is, the first component performs a first function and the second component performs a second function. The port physically interfaces with an external device. In one example, the port includes a plurality of terminals dedicated for signal routing to enable communication with the second component and not dedicated to enable communication with the first component. More generally, the port is selected from the group consisting of: USB port, a port that provides a connection for network communications with the apparatus, and a cable console port. Similarly, the first component is a USB client processor and the second component is selected from the group consisting of: a network processor and a console port circuit. The signal directing circuit selectively connects the port to one of the first and second components.

There are numerous variations for the signal directing circuit, examples of which are presented herein. In one example, the signal directing circuit is an analog switch that connects at least one terminal of the port to the component when the electrical device is in a power-off mode, and connects at least one terminal of the port to the second component when the apparatus is in a power-on mode. In another example, the signal directing circuit includes an electrical connection between at least one unused pin of the port and a terminal of the first component to route a signal from the external device to the first component when the external device is connected to the port. In still another example, the signal directing circuit includes at least a first diode connected in a signal path between the port and the first component and at least a second diode connected in a signal path between the port and the second component. Generally, the signal directing circuit includes elements selected from the group consisting of a relay, an analog switch, and one or more diodes.

Similarly, a system is provided comprising an electrical device including a first component, a second component that performs a different function than the first component, a port and a signal directing circuit coupled to the port and to selectively connect the port to the one of the first and the second components; and an external device that connects to the port. Again, the signal directing circuit includes one: of a relay, an analog switch, and one or more diodes.

The above description is intended by way of example only. Various modifications and structural changes may be made therein without departing from the scope of the concepts described herein and within the scope and range of equivalents of the claims.

What is claimed is:

1. An apparatus comprising:
    a port to physically interface with an external device;
    a first component coupled to a first set of pins included in the port and a second component coupled to a second set of the pins that are unused by the first component, wherein the first and second components perform different functions; and
    a signal directing circuit coupled to the port, wherein, when the apparatus is in a power-off mode, the signal directing circuit provides an operative connection between the port and the first component, via the first set of pins, and the external device supplies power to the first component to enable an exchange of information between the external device and the first component, and when the apparatus shifts to a power-on mode, the signal directing circuit shifts the operative connection to be between the port and the second component, via the second set of pins, and the apparatus supplies power to the second component to enable an exchange of information between the external device and the second component, the first component remaining coupled to the first set of pins when the operative connection is between the port and the second component, and the second component remaining coupled to the second set of pins when the operative connection is between the first component and the port.

2. The apparatus of claim 1, wherein the signal directing circuit further comprises:
    an analog switch that connects at least one terminal of the port to the first component when the apparatus is in the power-off mode and connects at least one terminal of the port to the second component when the apparatus is in the power-on mode.

3. The apparatus of claim 1, wherein the signal directing circuit routes a signal from the external device to the first component when the apparatus is in the power-off mode and the external device is connected to the port.

4. The apparatus of claim 1, wherein the port is selected from the group consisting of a Universal Serial Bus (USB) port, a port that provides a connection for network communications with the apparatus, and a cable console port.

5. The apparatus of claim 1, wherein the first component is a Universal Serial Bus (USB) client processor and the second component is selected from the group consisting of a network processor and a console port circuit.

6. The apparatus of claim 1, wherein the signal directing circuit includes at least a first diode connected in a signal path between the port and the first component and at least a second diode connected in a signal path between the port and the second component.

7. The apparatus of claim 1, wherein the port comprises a plurality of terminals dedicated for signal routing to enable communication with the second component and not dedicated to enable communication with the first component.

8. A system comprising:
    an electrical device including:
        a first component;
        a second component that performs a different function than the first component;
        a port, wherein the first component is coupled to a first set of pins included in the port and the second component is coupled to a second set of the pins that are unused by the first component; and
        a signal directing circuit coupled to the port to provide an operative connection between the port and the first component, via the first set of pins, when the electrical device is in a power-off mode and shift the operative connection to be between the port and the second component, via the second set of pins, when the electrical device shifts to a power-on mode, wherein the first component remains coupled to the first set of pins when the operative connection is between the port and the second component, and the second component remains coupled to the second set of pins when the operative connection is between the first component and the port; and
    an external device that connects to the port, wherein the external device supplies power to the first component when the electrical device is in the power-off mode to enable an exchange of information between the external device and the first component, and wherein the electrical device supplies power to the second component when the electrical device is in the power-on mode to enable an exchange of information between the external device and the second component.

9. The system of claim 8, wherein the signal directing circuit connects at least one terminal of the port to the first component when the electrical device is in the power-off mode.

10. The system of claim 8, wherein the port is selected from the group consisting of: a Universal Serial Bus (USB) port, a port that provides a connection for network communications with the apparatus, and a cable console port.

11. The system of claim 8, wherein the port enables network communications, the first component is a Universal Serial Bus (USB) client processor, the second component is a network processor, and the external device includes a USB host processor.

12. The system of claim 8, wherein the signal directing circuit includes elements selected from the group consisting of a relay, an analog switch, and one or more diodes.

13. The system of claim 8, wherein the signal directing circuit routes a signal from the external device to the first component when the electrical device is in the power-off mode and the external device is connected to the port.

14. The system of claim 8, wherein the port comprises a plurality of terminals dedicated for signal routing to enable communication with the second component and not dedicated to enable communication with the first component.

15. A method comprising:
    providing a port on an electrical device, the port being configured to physically interface with an external device, being coupled to a first component via a first set of pins included in the port, and being coupled to a second component via a second set of the pins that are unused by the first component;

when the electrical device is in a power-off mode, providing an operative connection between the port and the first component of the electrical device, via the first set of pins, that allows the external device to supply power to the first component and enable an exchange of information between the external device and the first component; and when the electrical device is in a power-on mode, providing an operative connection between the port and the second component of the electrical device, via the second set of pins, that is powered by the electrical device to enable an exchange of information between the external device and the second component, wherein the first and second components perform different functions, and wherein the first component remains coupled to the first set of pins when the operative connection is between the port and the second component, and the second component remains coupled to the second set of pins when the operative connection is between the first component and the port.

16. The method of claim 15, wherein the port comprises a plurality of terminals dedicated for signal routing to enable communication with the second component and not dedicated to enable communication with the first component.

* * * * *